United States Patent
Hufferd (10) Patent No.: US 7,043,578 B2
(45) Date of Patent: May 9, 2006

(54) METHOD, SYSTEM, AND PROGRAM FOR PROCESSING A PACKET INCLUDING I/O COMMANDS AND DATA

(75) Inventor: John Lewis Hufferd, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 287 days.

(21) Appl. No.: 10/340,882

(22) Filed: Jan. 9, 2003

(65) Prior Publication Data

US 2004/0139244 A1 Jul. 15, 2004

(51) Int. Cl.
G06F 13/42 (2006.01)
G06F 3/00 (2006.01)

(52) U.S. Cl. .................................... 710/105; 710/30
(58) Field of Classification Search ............... 710/30, 710/105
See application file for complete search history.

(56) References Cited

U.S. PATENT DOCUMENTS

| | | | | |
|---|---|---|---|---|
| 5,260,933 A | * | 11/1993 | Rouse | 370/216 |
| 5,996,024 A | * | 11/1999 | Blumenau | 719/326 |
| 6,295,575 B1 | | 9/2001 | Blumenau et al. | |
| 6,427,171 B1 | * | 7/2002 | Craft et al. | 709/230 |
| 6,658,480 B1 | * | 12/2003 | Boucher et al. | 709/239 |
| 6,804,804 B1 | * | 10/2004 | Gahan et al. | 714/748 |
| 2001/0037406 A1 | | 11/2001 | Philbrick et al. | |
| 2001/0049740 A1 | | 12/2001 | Karpoff | |
| 2002/0029281 A1 | | 3/2002 | Zeidner et al. | |
| 2003/0163590 A1 | * | 8/2003 | Cheng | 709/250 |
| 2003/0182455 A1 | * | 9/2003 | Hetzler et al. | 709/250 |
| 2004/0015611 A1 | * | 1/2004 | Kim | 709/250 |
| 2004/0078521 A1 | * | 4/2004 | Hawks et al. | 711/118 |
| 2004/0085977 A1 | * | 5/2004 | Gaur | 370/412 |

OTHER PUBLICATIONS

Cisco,ISCSI Protocol Concepts and Implementation, 2002.*
Bryce Mackin, ISCSI delivers storage over Ethernet,Sep. 9, 2002, NetworkWorldFusion.*
Cisco, Introduction to iSCSI, 2002.*
Intel, iSCSI:The Future of Network Storage.*
Alacritech and Nishan Systems, "Achieving Wire-Speed iSCSI Performance", An Alacritech and Nishan Systems Technical Note, [online], 2002, Retrieved from the Internet at <URL:http://www.alacritech.com/assets/applets/Alacritech_Hitachi_Nishan_iSCSI_Note.pdf>.

(Continued)

Primary Examiner—Paul R. Myers
Assistant Examiner—Christopher Daley
(74) Attorney, Agent, or Firm—David W. Victor; Konrad Raynes & Victor LLP (57) ABSTRACT

Provided are a method, system, and program for processing a packet including an Input/Output (I/O) command. A first level protocol processes a first level packet including a frame and a first level error code, wherein the first level error code is used to perform link-to-link error checking. A second level packet embedded in the first level packet frame is processed, wherein the second level packet includes an I/O command and a second level error code, and wherein the error code is used to perform end-to-end error checking. A second level packet frame in the second level packet including the I/O command is processed, wherein the packet comprises only the first level packet and the second level packet. The I/O command using an I/O protocol is processed.

38 Claims, 7 Drawing Sheets

OTHER PUBLICATIONS

Bunch, Bill, "An introduction to Auto-Negotiation", National Semiconductor, [online], 1995, [Retrieved on Nov. 5, 2002], Retrieved from the Internet at <URL: http://www.scyld.com/expert/NWay.html>.

Cisco Systems, "iSCSI Protocol Concepts and Implementation", © 1992-2001 Cisco Systems, Inc., pp. 1-12.

Fairhurst, Gorry, "Medium Access Control (MAC)", [online], Jan. 2001, [Retrieved on Sep. 5, 2002], Retrieved from the Internet at <URL: http://www.erg.abdn.ac.uk/users/gorry/course/lan-pages/mac.html>.

Kerns, Randy, "iSCSI Reality Check", *Storage Magazine*, [online], May 2002, [Retrieved on Sep. 2, 2002], Retrieved from the Internet at <URL: http://storagemagazine.techtarget.com/strgfeature/0,291266,sid35_gci821131,00.html>.

Larson, Caroline, Eric Yeh, Venu Mannem, and Herman Chao. "Introduction to iSCSI", 10 Gigabit Alliance, Version 1.0, Mar. 2002.

Preslan, K.W., A.P. Barry, J.E. Brassow, G.M. Erickson, E. Nygaard, C.J. Sabol, S.R. Soltis, D.C. Teigland, and M.T. O'Keefe, "A 64-bit, Shared Disk File System for Linux", *Mass Storage Systems, 1999 . 16th IEE Symposium on*. Mar. 15-18, 1999. pp. 22-41.

Satran, Julian, Kalman Meth, Costa Sapuntzakis, Mallikarjun Chadalapaka, & Efri Zeidner, "iSCSI", draft 15, Expiration Date Feb. 2003, © 2002 The Internet Society, pp. 1-282.

Satran, Julian, Kalman Meth, Costa Sapuntzakis, Mallikarjun Chadalapaka, & Efri Zeidner, "iSCSI", draft 16, Expiration Date Apr. 2003, © 2002 The Internet Society, pp. 1-283.

Sheinwald, Dafna, Julian Satran, Pat Thaler, Vicente Cavanna, and Matt Wakeley, "Memo: iSCSI CRC/Checksum Considerations", © 2002 The Internet Society, pp. 1-26.

Simitci, H., C. Malakapalli, and V. Gunturu, "Evaluation of SCSP Over TCP/IP and SCSI Over Fibre Channel Connections", Hot Interconnects 9, 2001, pp. 87-91.

SYRED Data Systems, "Storage Block Protocol (SBP) for iSCSI". Press Releases, [online], Nov. 2000, [Retrieved on Apr. 12, 2002], Retrieved from the Internet at <URL: www.syred.com/press-SBP.html>.

U.S. Appl. No. 09,651,910, filed Aug. 30, 2000, entitled "Transaction Support on Logical Disks", invented by . . . .

U.S. Appl. No. 10,053,010, filed Jan. 18, 2002, entitled "Virtualization of iSCSI Storage", invented by . . . .

U.S. Appl. No. 10,235,679, filed Sep. 5, 2002, entitled "Memory Management Offload for RDMA Enabled Network Adapters", invented by . . . .

U.S. Appl. No. 10,235,686, filed Sep. 5, 2002, entitled "iSCSI Driver to Adapter Interface Protocol", invented by . . . .

Van Meter, Rodney, Gregory G. Finn, and Steve Hotz, "VISA: Netstation's Virtual Internet SCSI Adapter", *Proceedings of the 8th International Conference on Architectural Support for Programming Languages and Operating Systems*. San Jose, CA, 1998, pp. pp. 71-80.

Voruganti, K. and P. Sarkar, "An Analysis of Three Gigabit Networking Protocols for Storage Area Networks", *Performance Computing, and Communications, 2001. IEEE International Conference on*. pp. 259-265.

* cited by examiner

FIG. 3 iSCSI Header for SCSI Initiator Command

FIG. 4A iSCSI Header and Data Sections
of an iSCSI Target Response PDU

METHOD, SYSTEM, AND PROGRAM FOR PROCESSING A PACKET INCLUDING I/O COMMANDS AND DATA

BACKGROUND OF THE INVENTION

1. Field of the Invention

The present invention relates to a method, system, and program for processing a packet including I/O commands and data

2. Description of the Related Art

In storage environments, data access commands are communicated from a host system to a storage controller, which manages access to the disks. The storage controller may be a card inside the host system or a separate device. The Internet Small Computer Systems Interface (iSCSI) protocol is used for storage networks that utilize Ethernet connections, including Ethernet switches and routers. The term "iSCSI" as used herein refers to the syntax and semantic of the iSCSI defined by the IETF (Internet Engineering Task Force) standards body, and any variant of that protocol. In current storage networks where iSCSI is utilized, the packet configuration comprises an Ethernet package encapsulating an Internet Protocol (IP) and Transmission Control Protocol (TCP) package layers, which further encapsulate an iSCSI package that includes one or more SCSI commands. The Ethernet protocol provides for link-level error checking as the packets flow from point-to-point on any network segment (link) to determine whether data has been corrupted while passing on a link. In network data transmission operations, an initiator device transmits data or commands over the network to a target device. The TCP/IP package includes an error correction code to perform an end-to-end checking to determine at the opposite end whether the transmitted packet has changed during the transmission as the packet passes through switches and routers. A receiving device detecting an error will send a negative acknowledgment to the sending device to request retransmission of those packets in which errors were detected.

Both an initiator of such an iSCSI command and the target must include code for the Ethernet, TCP/IP, and iSCSI protocols when processing each part of the transmitted package. The target device, upon receiving the packet, will use the Ethernet protocol to access the TCP/IP package, then use the TCP/IP protocol to access the iSCSI package, and then use the iSCSI protocol to access the SCSI commands within the iSCSI package.

Many manufacturers that want their devices to participate in an iSCSI environment must provide controllers capable of processing the Ethernet, TCP/IP and iSCSI protocols. Such capability requires that the processor include sufficient computational resources and power to execute all the communication protocols. Such code may be quite costly for limited controllers, like storage disk controllers.

Accordingly, there is a need in the art for improved techniques for transmitting packets of data over a network, such as a small network where packet reordering, or out of order reception is not an issue.

SUMMARY OF THE DESCRIBED IMPLEMENTATIONS

Provided are a method, system, and program for processing a packet including an Input/Output (I/O) command. A first level protocol processes a first level packet including a frame and a first level error code, wherein the first level error code is used to perform link-to-link error checking. A second level packet embedded in the first level packet frame is processed, wherein the second level packet includes an I/O command and a second level error code, and wherein the error code is used to perform end-to-end error checking. A second level packet frame in the second level packet including the I/O command is processed, wherein the packet comprises only the first level packet and the second level packet. The I/O command using an I/O protocol is processed.

In further implementations, the first level protocol may comprise a link level protocol, such as an Ethernet protocol, and the second level protocol may comprise iSCSI and the second level packet frame may comprise an iSCSI Protocol Data Unit (PDU). Still further, the second level packet frame may include an iSCSI header, wherein the I/O command and additional processing instructions and status are included in the iSCSI header. Still further, the first level protocol may comprise an Ethernet protocol, wherein the packet only includes the Ethernet packet including the iSCSI packet.

With the described implementations, an I/O command is packaged within only two layers comprised of first and second level packets, thereby eliminating the use of additional layers. With the described implementations, the end-to-end error checking is implemented by the second level packet. The described implementations substantially minimize the computational resources needed to process an I/O command transmitted by only using two layers, and using the second level packet to handle end-to-end error checking. In this way, both the initiator and target devices only need one physical layer to handle the link-to-link processing and one transport layer to handle the end-to-end checksum operation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
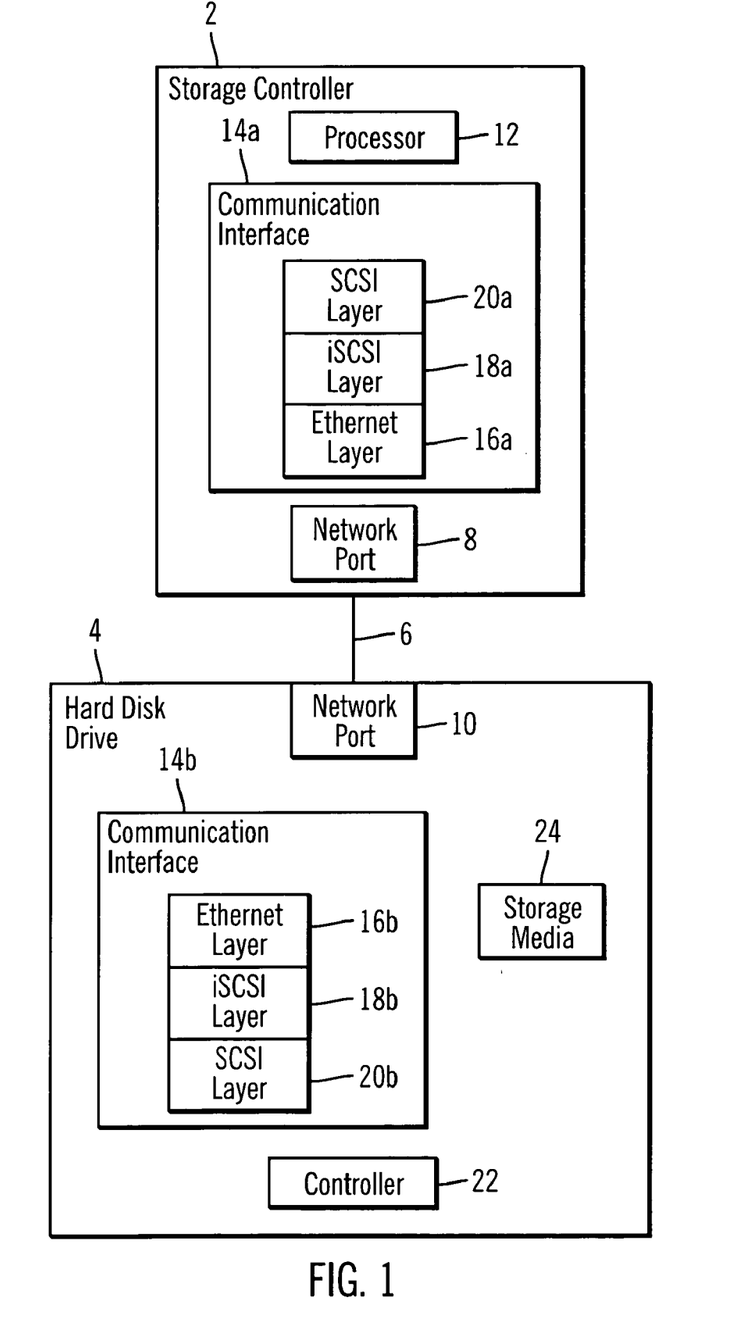
FIG. 1 illustrates a computing environment in which aspects of the invention are implemented.

FIG. 1 illustrates a computing environment in which aspects of the invention may be implemented. A storage controller 2 would communicate Input/Output (I/O) commands to a hard disk drive 4 through an Ethernet cable 6. The storage controller 2 may comprise a processor embedded in a card, such as a Peripheral Component Interconnect (PCI) card, or on a computer motherboard to provide communication with disk drives within the computer or external to the computer. Further, the storage controller 2 may comprise a stand alone computer that communicates with external hard disk drive 4. The storage controller 2 and hard disk drive 4 have network ports 8 and 10, respectively, to which the network cable 6 connects. The network ports 8, 10 may comprise Ethernet ports on Ethernet cards or any other network ports known in the art. Although a hard disk drive 4 is described, those skilled in the art will appreciate that any storage device known in the art may be used in place of the described hard disk drive 4.

The storage controller 2 includes a processor 12 and a communication interface 14a including an Ethernet layer 16a, iSCSI layer 18a, and SCSI layer 20a. The hard disk drive 4 includes a controller 22 and also includes a communication interface 14b including an Ethernet layer 16a, iSCSI layer 18a, and SCSI layer 20a. The communication interfaces 14a, 14b enable communication between the storage controller 2 and hard disk driver 4. The controller 22 is capable of generating commands to control a read/write mechanism (not shown) to access data on the storage medium 24, which may comprise a magnetic storage medium. With the described architecture, the storage controller 2 connects to the disk drive 4 unit using a common network interface, such as Ethernet, which is relatively inexpensive to implement. Although FIG. 1 shows one port 8 and 10 on the devices 2 and 4, in further implementations the storage controller 2 and/or hard disk drive 4 may each include multiple ports to provide multiple connection paths thereto.

In the communication interfaces 14a, 14b, the Ethernet layer 16a, 16b comprises the physical layer that handles the data transmission, the iSCSI layer 18a, 18b comprises the transport layer that handles the message addressing, specifies the transmission type and validates each transmission sequence, and the SCSI layer 20a, 20b handles and interprets the commands, which in the described implementations comprise SCSI commands. Further, the communication interfaces 14a, 14b and layers therein may operate as either an initiator or target device, depending on the context.

Figure 2:
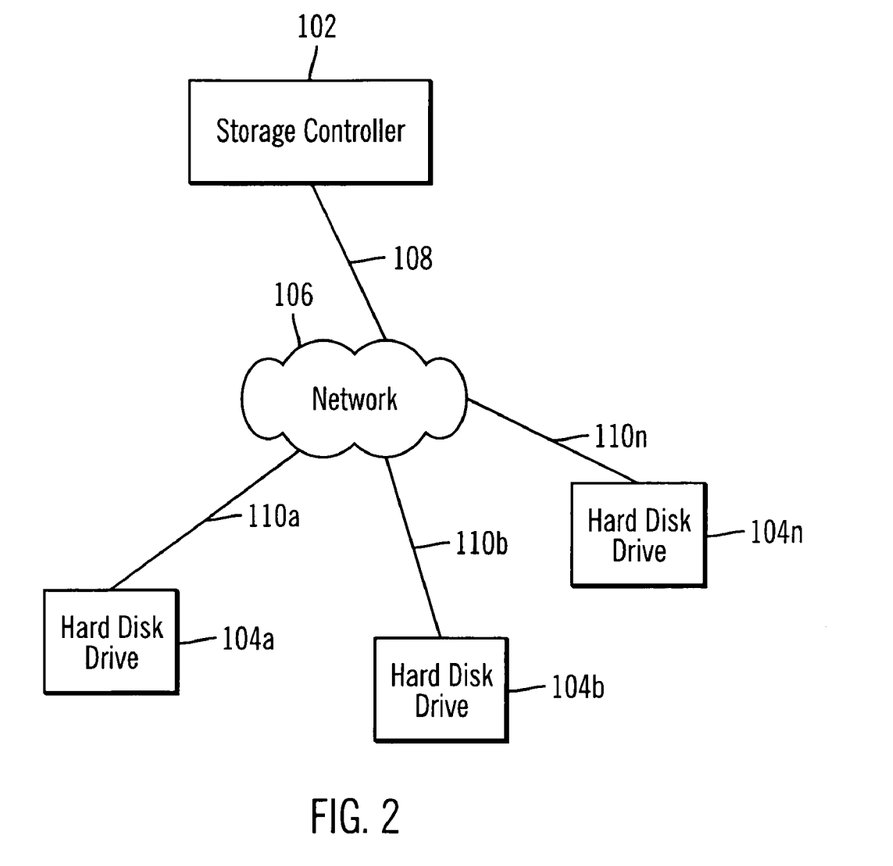
FIG. 2 illustrates an alternative network computing environment in which aspects of the invention are implemented.

FIG. 2 illustrates an additional implementation where the storage controller 102 connects to a plurality of disk drives 104a, 104b . . . 104n over a network 106, where the network 106 may comprise one or more switches, hubs, routers, etc. The storage controller 102 and each of the disk drives 104a, 140b . . . 104n connect to the network 106 through network cables 108 and 110a, 110b . . . 110n. The storage controller 102 may include the components of the storage controller 2, including the communication interface 14a and network switches for the network 106. The hard disk drives 104a, 104b . . . 104n may include the components of the hard disk drive 4, including the communication interface 14b.

Figure 3:
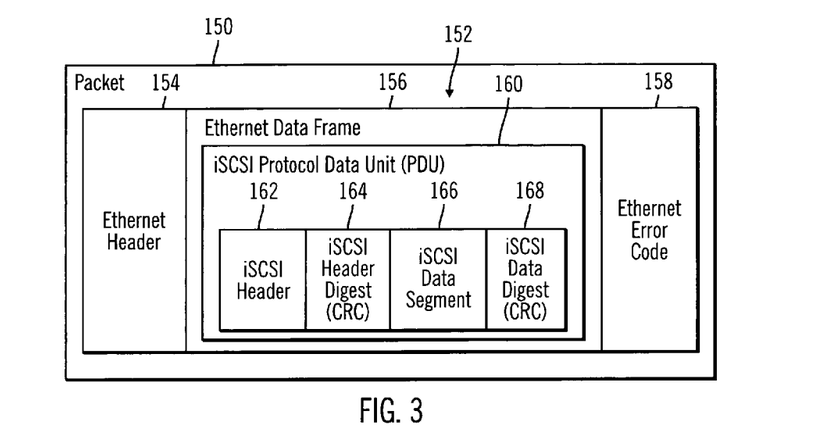
FIG. 3 illustrates a packet architecture in accordance with implementations of the invention.

FIG. 3 illustrates a data structure of the architecture of a packet encapsulating data in accordance with implementations of the invention. A packet 150 includes an Ethernet sub-packet 152 having an Ethernet header 154, an Ethernet data frame 156, and an Ethernet cycle redundancy check (CRC) code 158 used to perform link-level error detection at any routers between the storage controller 2, 102 and hard disk drive 4, 104a, 104b . . . 104n. The Ethernet sub packet 152 may include additional fields and flags not shown that are known in the art and used in the art for Ethernet communication. The Ethernet data frame 156 includes an iSCSI Protocol Data Unit (PDU) 160 having one or more iSCSI header 162 segments; an iSCSI header digest 164 comprising a CRC code for use in error checking the iSCSI header 162 segments; an optional iSCSI data segment 166; and an optional iSCSI data digest 168 comprising a CRC code for use in error checking the iSCSI data segment 166. Further, the iSCSI negotiation properties may ensure that all the iSCSI PDUs fit into an Ethernet Frame, and only one PDU is included in each frame.

Figure 4A:
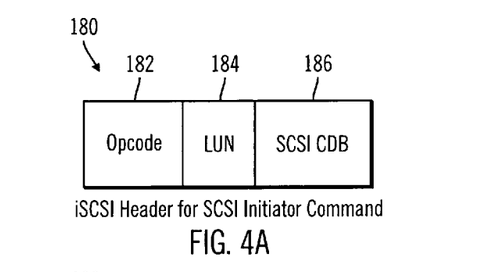
FIGS. 4a and 4b illustrates a generic description of certain fields in an iSCSI package.
Figure 4B:
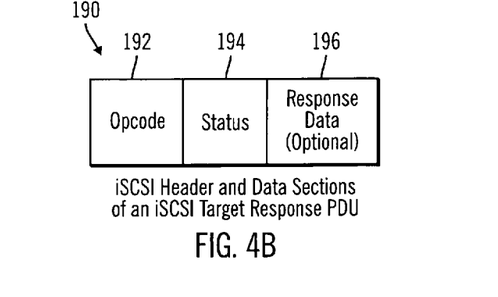

The iSCSI header 162 includes an opcode that indicates the type of operation being transmitted by the transmitting device. There are initiator opcodes and target opcodes. FIG. 4a illustrates certain of the information included in the iSCSI header 162 when the packet 150 is transmitted by an initiator, such as the storage controller 2, 102, and includes a SCSI command. The initiator iSCSI header 180 has an opcode field 182 for initiator opcodes and control information, a logical unit number (LUN) 184 indicating a LUN against which the SCSI command operates, and a SCSI Command Descriptor Block (CDB) 186 specifying the specific SCSI command that is processed by the SCSI layer 14b at the hard disk drive 4, 104a, 104b . . . 104n . . . FIG. 4b illustrates certain of the information included in the iSCSI header 162 when the packet 150 is transmitted by a target device, such as the hard disk drives 4, 104a, 104b . . . 104n, in response to a request by the initiator, such as the storage controller 2, 102. The target iSCSI header 190 includes, among other things, an opcode field 192 for target opcodes and control information; a status field 194 indicating the SCSI status of the received command, e.g., good, check condition, busy, etc.; and response data 196, such as data to return in response to a SCSI read request.

FIGS. 5–8 illustrate logic implemented in the communication interfaces 14a, 14b to generate and process packets in accordance with implementations of the invention. The logic of the communication interfaces 14a, 14b, including the layers 16a, 16b, 18a, 18b, 20a, 20b, may be implemented in part or in whole in hardware devices, such as PCI cards, on-board semiconductor devices, and/or device drivers and other logic executed by the processors 12, 22.

Figure 5:
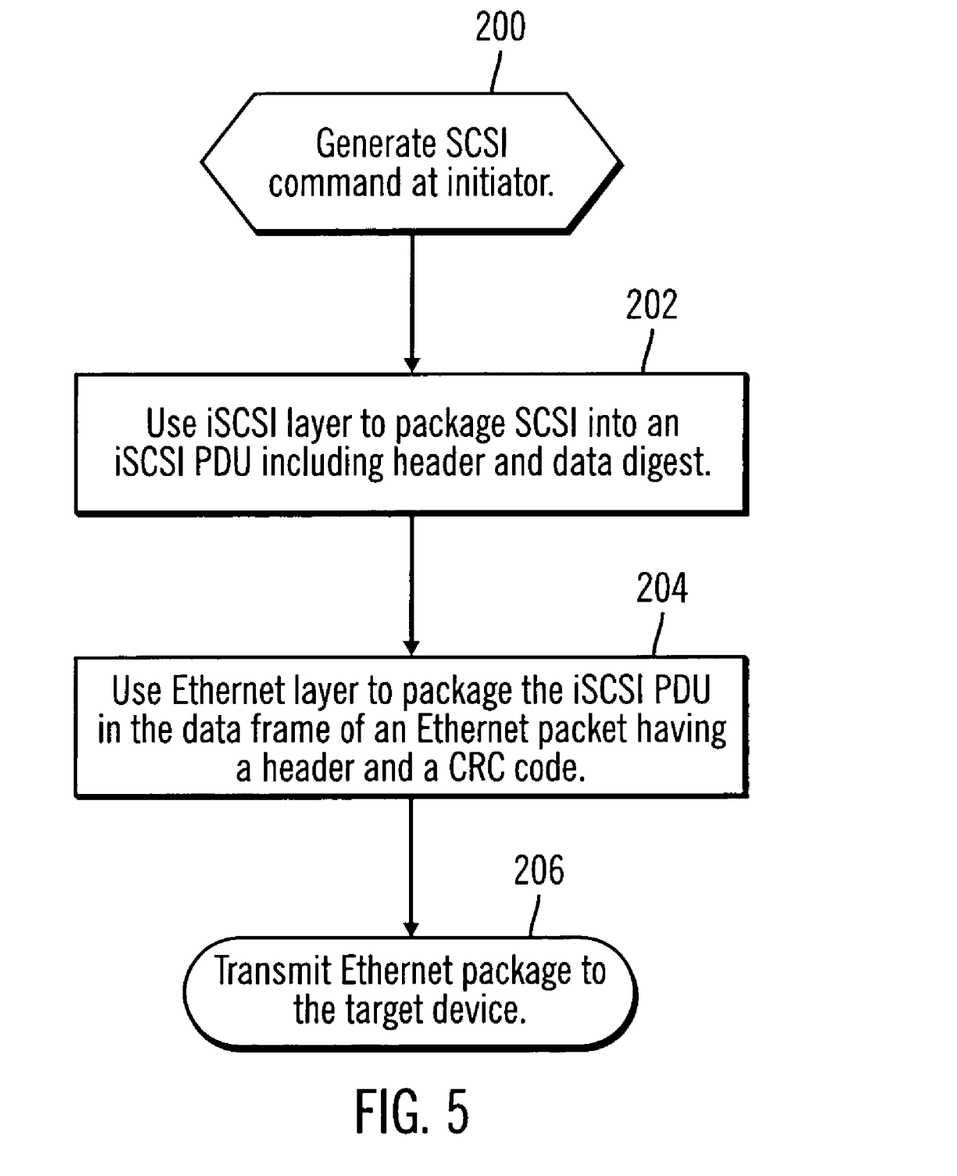
FIG. 5 illustrates logic to generate a packet including an Input/Output (I/O) command in accordance with implementations of the invention.

FIG. 5 illustrates logic implemented in the communication interface 14a operating as the initiator to generate a packet having a SCSI command in accordance with implementations of the invention. After generating a SCSI command (at block 200), the communication interface 14a uses (at block 202) the iSCSI layer 18a to package a SCSI command into an iSCSI header 162 of an iSCSI PDU 160 including a header and data digest 164, 168 having a CRC code to perform end-to-end error checking of the iSCSI PDU having the SCSI command. As mentioned, the SCSI command includes a SCSI CDB in field 186 of the iSCSI header 180 (FIG. 4a). The Ethernet layer 16a is then used (at block 204) to package the iSCSI PDU in the data frame 156 of an Ethernet packet 152 having a header 154 and CRC code 158. The initiator, such as the storage controller 2, 102 would then transmit (at block 206) the generated Ethernet packet 150 to the target hard disk drive 4, 104a, 104b . . . 104n.

Figure 6:
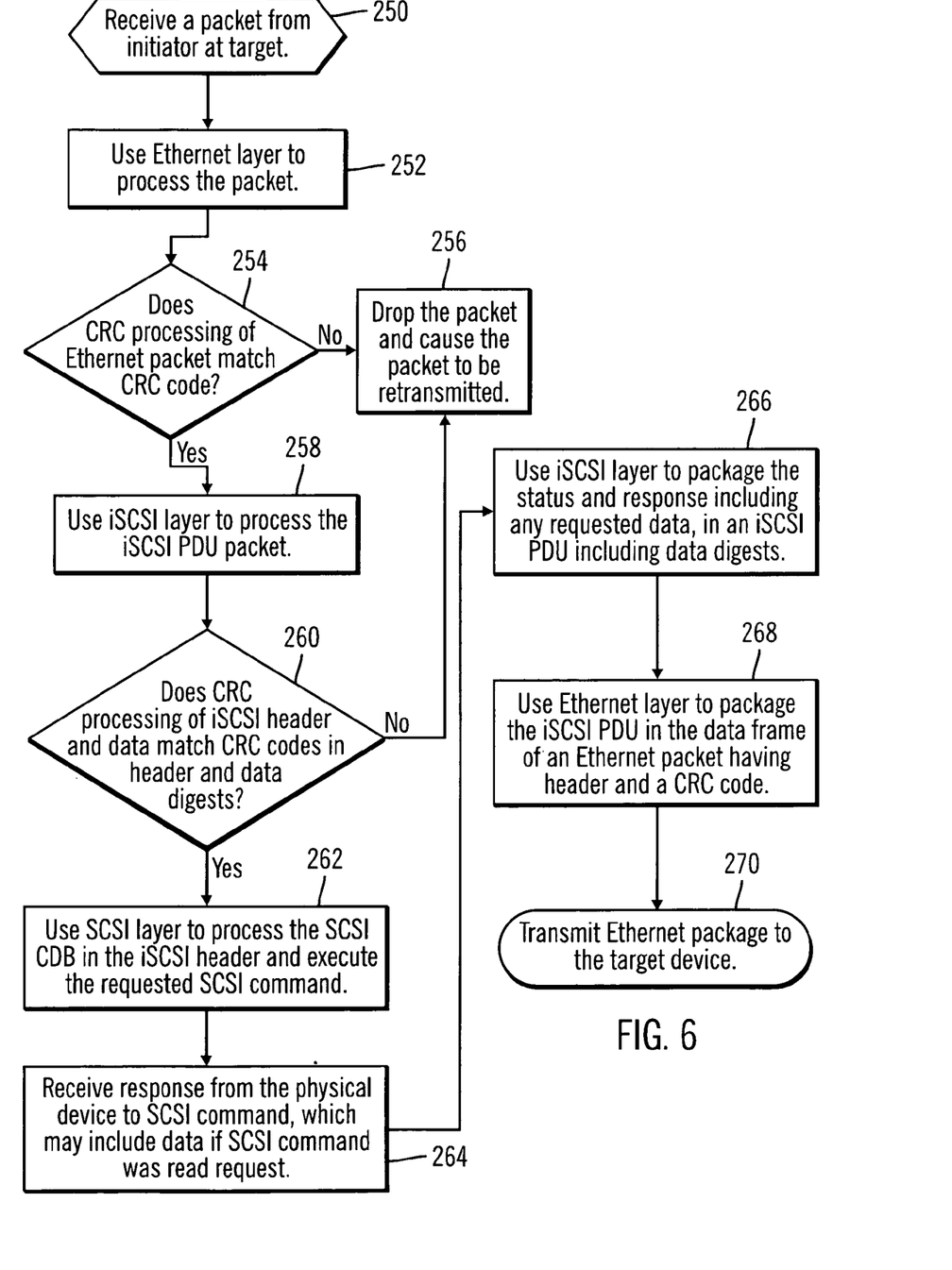
FIG. 6 illustrates logic to process a packet including the I/O command in accordance with implementations of the invention.

FIG. 6 illustrates logic implemented in the communication interface 14b operating as a target receiving a packet 150 (FIG. 3) generated by an initiator device according to the logic of FIG. 5. Upon receiving (at block 250) a packet 150 from the initiator device, e.g., the storage controller 2, 102 or the communication interface 14b at the target, uses (at block 252) the Ethernet layer 16b to process the packet 150. If (at block 254) the CRC processing of the Ethernet packet 150 does not match the error code, or CRC, in the ethernet CRC code 158 field, then a link-level error may have occurred on the link 6 (FIG. 1), 108, 110a, 110b (FIG. 2) or somewhere within the network switches and network 106, and be detected at the network port 10 receiving the request. In such case, the Ethernet layer 16b drops (at block 256) the received packet 150 and requests retransmission, i.e., returns a negative acknowledgment (NACK) message to the initiator. If (at block 254) the CRC processing of the Ethernet packet 150 matches Ethernet error code 158, then the target communication interface 14b uses (at block 258) the iSCSI layer to process the PDU packet 160.

If (at block 260) the CRC processing of the iSCSI header 162, which includes the SCSI CDB 186 (FIG. 4a), does not match the CRC code in the iSCSI data digest 168, then an end-to-end error may have occurred in the header, which may include corruption of the actual SCSI request. In such case, control proceeds to block 256 to drop the packet and cause retransmission of the packet using the iSCSI defined protocols and procedures. Otherwise, if (at block 260) the iSCSI header 162 passes the error checking, then the target communication interface 14b uses (at block 262) the SCSI layer to process the SCSI CDB in the iSCSI header and execute the requested SCSI command. The error checking operation may further involve a check to determine whether the data in the optional data digest data digest indicates an error, and if so discard that PDU and cause it to be retransmitted via the iSCSI defined protocol and processes.

After completing processing of the SCSI request, the target communication interface 14b uses (at block 266) the iSCSI layer 18b to package the status and SCSI response, including any requested data if the SCSI request was a read and data is successfully retrieved, in the header and data section of the iSCSI PDU 182 and 160, including a header digest 164 and the data digest 168. The Ethernet layer 16b is then used (at block 268) to package one of the iSCSI PDUs including the SCSI response and optional data in the data frame 156 of an Ethernet packet 150 having a header 154 and error code 158. This generated response packet is then transmitted (at block 270) back to the initiator.

Figure 7:
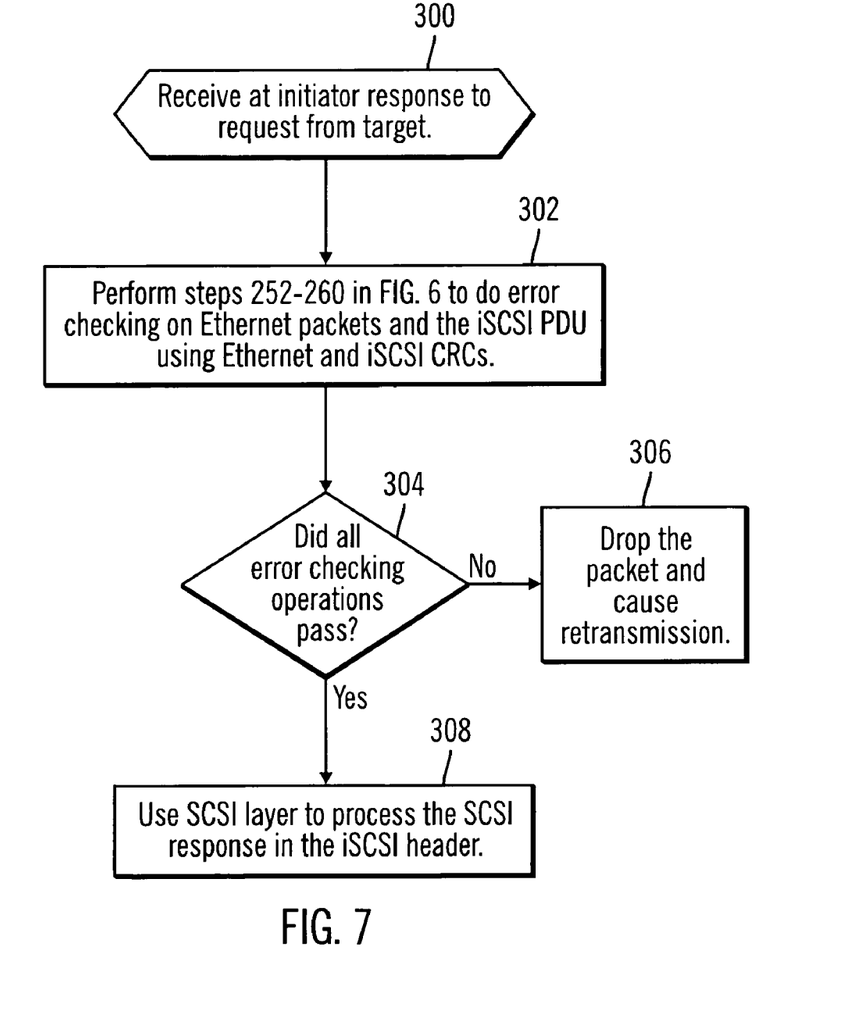
FIG. 7 illustrates logic to process a packet including a response to the I/O command in accordance with implementations of the invention.

FIG. 7 illustrates logic implemented in the communication interface 14a operating as an initiator receiving a packet 150 (FIG. 3) generated and transmitted by the target device according to the logic of FIG. 6. Upon receiving (at block 300) a target response to a SCSI command, the communication interface 14a performs (at block 302) steps 252–260 to do error checking on Ethernet packet 150 (FIG. 3) and iSCSI PDU 160 using Ethernet and iSCSI error codes 158, 164, and 168, respectively. If (at block 304) all error checking operations did not pass, then the packet would be dropped (at block 306) and retransmission requested as part of the normal Ethernet or iSCSI retransmission protocol and processes. Otherwise, if the error checking operations passed, then the SCSI layer 18a is used (at block 308) to process the SCSI response in the iSCSI response PDU 190.

With the described implementations, the SCSI command is packaged within only two layers, an Ethernet layer and an iSCSI layer, thereby eliminating the use of a TCP/IP layer and the requirement that the communication interface include a TCP/IP layer, which is often part of iSCSI. With the described implementations, the end-to-end error checking is implemented by the iSCSI protocol layer. The described implementations substantially minimize the computational resources needed to process a SCSI command transmitted by not using the TCP/IP layer, and instead using the iSCSI protocol layer to handle end-to-end checking. In this way, both the initiator and target devices only need one physical layer to handle the link-to-link processing, such as Ethernet, and one transport layer to handle the end-to-end checksum operation, such as the iSCSI layer. Thus, computational resources are conserved because when generating a packet and unpacking a packet, only two layers, Ethernet and iSCSI, are used. Further, both the Ethernet and iSCSI layers are less computationally demanding than the TCP/IP protocol, thus further optimizing the amount of computational resources conserved.

Additional Implementation Details

The described techniques for transferring data access commands a distributed computing system may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, the initiator comprised the storage controller and the target device comprised the hard disk drive. In alternative implementations, the initiator may comprise any computing device known in the art and the target may comprise any I/O device known in the art capable of processing commands transmitted from the initiator device.

In the described implementations, the physical layer utilized the Ethernet protocol. In alternative implementations, alternative protocols providing link-to-link checksumming of the packet may be used instead of Ethernet, such as Serial Advanced Technology Attachment (SATA), Infiniband, serial attached SCSI cable, etc.

In described implementations, the transport layer comprised the iSCSI protocol. In alternative implementations other protocols known in the art for transmitting I/O commands in packets and providing end-to-end checksumming may be used.

In the described implementations, the packaged I/O commands comprised SCSI commands. In alternative implementations, the commands may be in different I/O command formats than SCSI.

In the description above, certain fields in the Ethernet and iSCSI packets shown in FIGS. 3, 4a, and 4b were described. Those skilled in the art will appreciate that certain described aspects of the invention may be implemented using the Ethernet and iSCSI protocols with different information embedded in the packet in addition to the encapsulated information described above. The information included with any of the packets implemented in the manner described above may include additional iSCSI information, such as iSCSI information described in the publication "ISCSI", IPS Internet Draft, Document title "draft-ietf-ips-iscsi-19.txt", published by the Internet Engineering Task Force (November, 2002), which publication is incorporated herein by reference in its entirety. Further, the order of the information presented in the packets shown in FIGS. 3, 4a, and 4b may differ than the illustrated order.

The illustrated logic of FIGS. 5, 6, and 7 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 8:
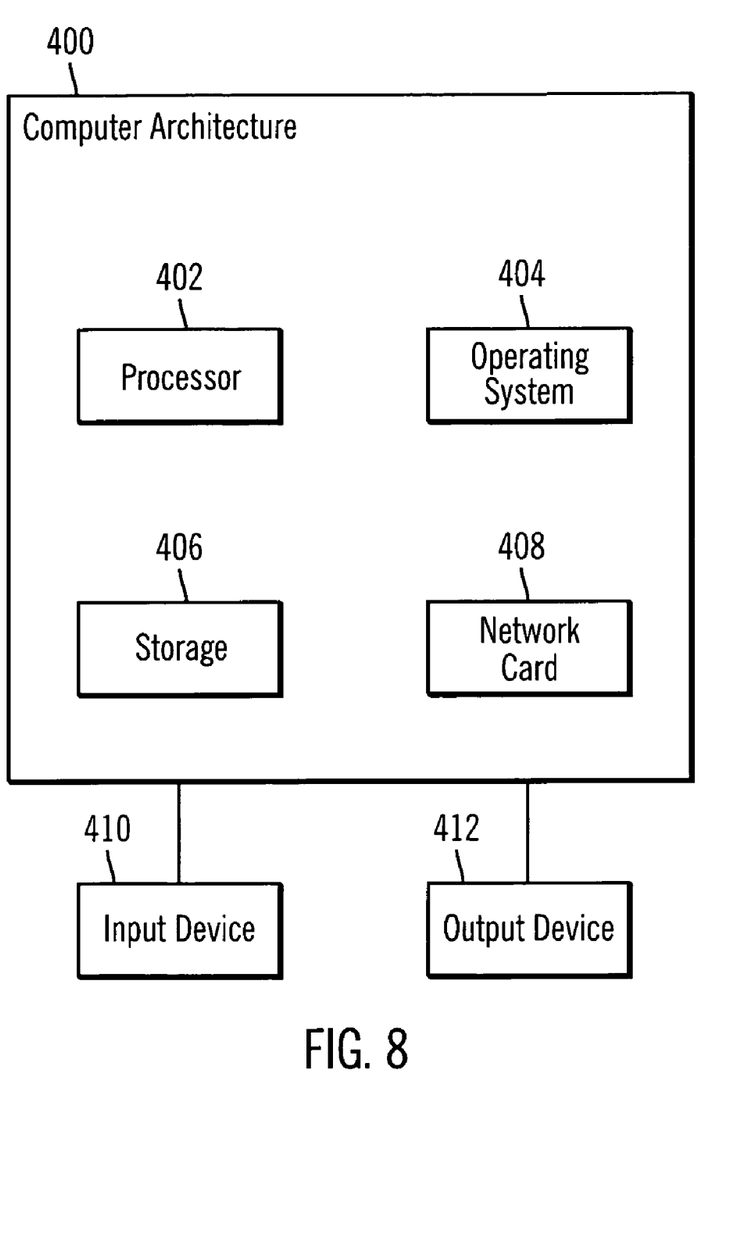
FIG. 8 illustrates an architecture of computing components in the storage controller.

FIG. 8 illustrates one implementation of a computer architecture 400 of the storage controller, shown in FIGS. 1 and 2. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a packet including an Input/Output (I/O) command, comprising:

processing, with a first level protocol, a first level packet including a frame and a first level error code, wherein the first level error code is used to perform link-to-link error checking;

processing, with a second level protocol, a second level packet embedded in the first level packet frame, wherein the second level packet includes an I/O command and a second level error code, wherein the error code is used to perform end-to-end error checking;

processing a second level packet frame in the second level packet including the I/O command, wherein the packet comprises only the first level packet and the second level packet; and processing the I/O command using an I/O protocol.

2. The method of claim 1, wherein the first level protocol comprises a link level protocol.

3. The method of claim 2, wherein the first level protocol comprises an Ethernet protocol.

4. The method of 1, wherein the second level protocol comprises iSCSI and wherein the second level packet frame comprises an iSCSI Protocol Data Unit (PDU).

5. The method of claim 4, wherein the second level packet frame includes an iSCSI header, wherein the I/O command and additional processing instructions and status are included in the iSCSI header.

6. The method of claim 4, wherein the first level protocol comprises an Ethernet protocol, wherein the packet only includes the Ethernet packet including the iSCSI packet.

7. The method of claim 1, wherein processing the first level packet and second level packet comprises building, with an initiator, the first level and second level packets and wherein processing the I/O command comprises embedding, with the initiator, the I/O command in the second level packet, further comprising:

transmitting the packet to a target device.

8. The method of claim 1, wherein processing the first level packet comprises accessing the second level packet, wherein processing the second level packet comprises accessing the I/O command in the second level packet, and wherein processing the I/O command comprises executing the I/O command.

9. The method of claim 8, further comprising:

sending, by the target, a solicitation for data packets from the initiator that the target needs for execution of a previous command, wherein the solicitation is contained in the second level packet which is embedded in the first level packet.

10. The method of claim 8, further comprising:

sending a response to the initiator resulting from executing the I/O command;

building, with the first and second level protocols, a return packet including a first level packet and a second level packet;

generating information on the response using the I/O protocol;

embedding information on the response in the second level packet; and transmitting the return packet to the initiator.

11. A device for processing a packet including an Input/Output (I/O) command, comprising:

(a) a first control module including a first level protocol to process a first level packet including a frame and a first level error code, wherein the first level error code is used to perform link-to-link error checking;

(b) a second control module including a second level protocol to:

(i) process a second level packet embedded in the first level packet frame, wherein the second level packet includes an I/O command and a second level error code, wherein the second level error code is used to perform end-to-end error checking; and (ii) processing a second level packet frame in the second level packet including the I/O command, wherein the packet comprises only the first level packet and the second level packet; and (c) a third control module including an I/O protocol to process the I/O command.

12. The device of claim 11, wherein the first, second, and third control modules are implemented by computational resources that are a member of the set of computational resources comprising: a processor and code executed by the processor; and hardware logic implemented within an integrated circuit device.

13. The device of claim 11, wherein the first level protocol comprises a link level protocol.

14. The device of claim 13, wherein the first level protocol comprises an Ethernet protocol.

15. The device of claim 11, wherein the second level protocol comprises iSCSI and wherein the second level packet frame comprises an iSCSI Protocol Data Unit (PDU).

16. The device of claim 15, wherein the second level packet frame includes an iSCSI header, wherein the I/O command is included in the iSCSI header.

17. The device of claim 15, wherein the first level protocol comprises an Ethernet protocol, wherein the packet only includes the Ethernet packet including the iSCSI packet.

18. The device of claim 11, wherein the device comprises an initiator that processes the first level packet and second level packet by building the first level and second level packets and processes the I/O command by embedding the I/O command in the second level packet, wherein the initiator further transmits the packet to a target device.

19. The device of claim 11, wherein the device comprises a target device receiving the packet from an initiator, and wherein the target device processes the first level packet by accessing the second level packet, and processes the second level packet by accessing the I/O command in the second level packet, and processes the I/O command by executing the I/O command.

20. The device of claim 11, wherein the target device comprises a storage device having a port to receive the packet from the initiator.

21. The device of claim 20, wherein the port comprises an Ethernet port.

22. The device of claim 21, wherein the initiator includes an Ethernet port and is directly connected the Ethernet port on the target storage device.

23. The device of claim 21, wherein the initiator includes an Ethernet port and connects through at least one switch to the Ethernet port on the target storage device.

24. The device of claim 20, further comprising:
a plurality of storage devices each including a port and the first level protocol, second level protocol, and I/O protocol to process packets transmitted by the initiator.

25. The device of claim 19, wherein the target device completes executing the I/O command and uses the first and second level protocols to build a return packet including a first level packet and a second level packet, and uses the I/O protocol to generate information on the response, and uses the second level protocol to embed information on the response in the second level packet, wherein the return packet is transmitted to the initiator.

26. An article of manufacture for processing a packet including an Input/Output (I/O) command, wherein the article of manufacture causes operations to be performed, the operations comprising:

processing, with a first level protocol, a first level packet including a flame and a first level error code, wherein the first level error code is used to perform link-to-link error checking;

processing, with a second level protocol, a second level packet embedded in the first level packet frame, wherein the second level packet includes an I/O command and a second level error code, wherein the error code is used to perform end-to-end error checking;

processing a second level packet frame in the second level packet including the I/O command, wherein the packet comprises only the first level packet and the second level packet; and processing the I/O command using an I/O protocol.

27. The article of manufacture of claim 26, wherein the first level protocol comprises a link level protocol.

28. The article of manufacture of claim 27, wherein the first level protocol comprises an Ethernet protocol.

29. The article of manufacture of claim 26, wherein the second level protocol comprises iSCSI and wherein the second level packet frame comprises an iSCSI Protocol Data Unit (PDU).

30. The article of manufacture of claim 29, wherein the second level packet frame includes an iSCSI header, wherein the I/O command and additional processing instructions and status are included in the iSCSI header.

31. The article of manufacture of claim 29, wherein the first level protocol comprises an Ethernet protocol, wherein the packet only includes the Ethernet packet including the iSCSI packet.

32. The article of manufacture of claim 26, wherein processing the first level packet and second level packet comprises building, with an initiator, the first level and second level packets and wherein processing the I/O command comprises embedding, with the initiator, the I/O command in the second level packet, further comprising:
transmitting the packet to a target device.

33. The article of manufacture of claim 26, wherein processing the first level packet comprises accessing the second level packet, wherein processing the second level packet comprises accessing the I/O command in the second level packet, and wherein processing the I/O command comprises executing the I/O command.

34. The article of manufacture of claim 33, further comprising:
sending, by the target, a solicitation for data packets from the initiator that the target needs for execution of a previous command, wherein the solicitation is contained in the second level packet which is embedded in the first level packet.

35. The article of manufacture of claim 33, further comprising:
sending a response to the initiator resulting from executing the I/O command;
building, with the first and second level protocols, a return packet including a first level packet and a second level packet;
generating information on the response using the I/O protocol;
embedding information on the response in the second level packet; and
transmitting the return packet to the initiator.

36. The method of claim 1, wherein the second level packet includes a header, wherein the I/O command is included in the bender of the second level packet.

37. The system of claim 11, wherein the second level packet includes a header, wherein the I/O command is included in the header of the second level packet.

38. The article of manufacture of claim 26, wherein the second level packet includes a header, wherein the I/O command is included in the header of the second level packet.

* * * * *

UNITED STATES PATENT AND TRADEMARK OFFICE
CERTIFICATE OF CORRECTION

| | | |
|---|---|---|
| PATENT NO. | : 7,043,578 B2 | Page 1 of 1 |
| APPLICATION NO. | : 10/340882 | |
| DATED | : May 9, 2006 | |
| INVENTOR(S) | : John Lewis Hufferd | |

It is certified that error appears in the above-identified patent and that said Letters Patent is hereby corrected as shown below:

<u>Column 11</u>, line 3, delete "bender" and insert -- header --.

Signed and Sealed this

First Day of May, 2007

JON W. DUDAS
*Director of the United States Patent and Trademark Office*